Aug. 3, 1926.

F. F. HESSE 1,594,954

TANDEM CLEANER

Filed Nov. 30, 1921     2 Sheets-Sheet 1

Inventor
Frederic F. Hesse
By Hull, Brock & West
Attys.

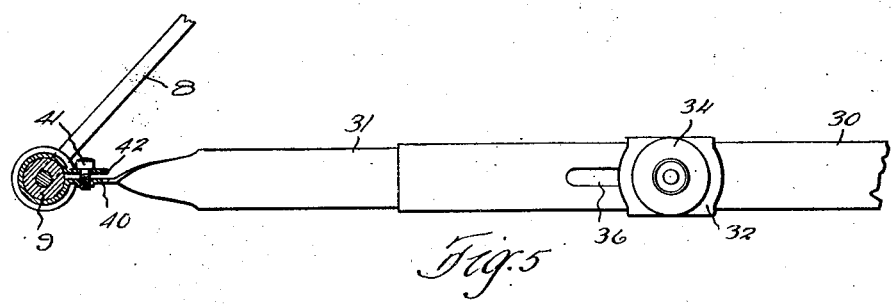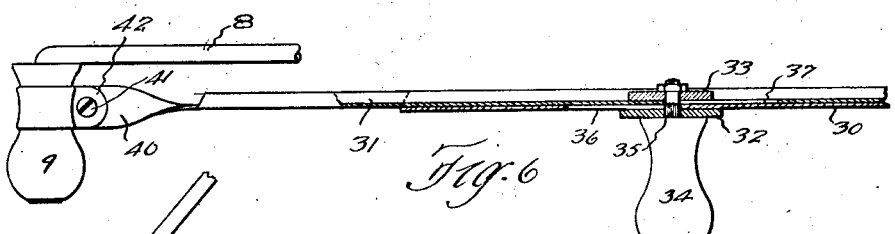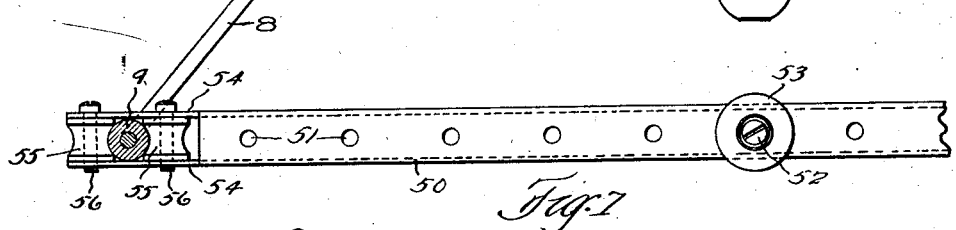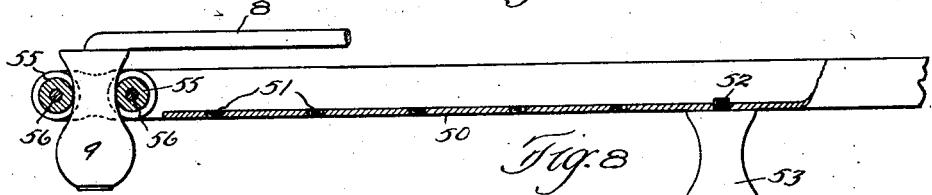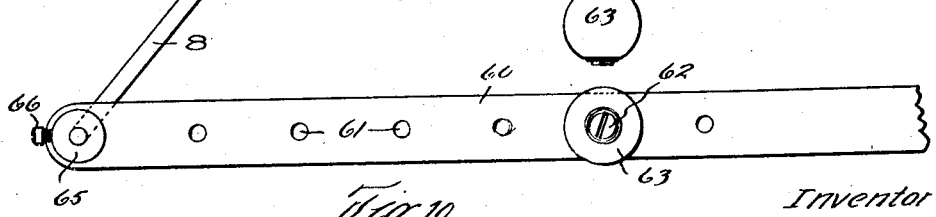

Patented Aug. 3, 1926.

1,594,954

UNITED STATES PATENT OFFICE.

FREDERIC F. HESSE, OF LAKEWOOD, OHIO, ASSIGNOR TO THE OUTLOOK COMPANY, OF CLEVELAND, OHIO, A CORPORATION OF OHIO.

TANDEM CLEANER.

Application filed November 30, 1921. Serial No. 518,780.

This invention relates to improvements in windshield cleaning apparatus, and it has for its general aim to provide means whereby a plurality of wipers, engaging separated areas on the outer side of a windshield pane, may be organized into and operated as a unit to the end that a greater area of the windshield may be cleaned than in cases where only one wiper is employed so that, besides the driver, other occupants of the vehicle may during inclement weather have a clear vision of the road ahead; and when the invention is incorporated in a hand operated device, the common actuating means for the wipers is preferably so located that it may be used conveniently by either the driver or the person sitting next to him.

More limitedly, my invention has for its purpose the provision of means through which the actuating elements or cranks of two windshield cleaners may be connected and the cleaners operated in unison.

A further and still more limited object is to provide means of the aforesaid character in the nature of a bar that is preferably adjustable in length; is likewise equipped with an operating handle that may be adjusted longitudinally of the bar; and which incorporates means whereby it may be conveniently connected to the actuating elements or cranks of separate windshield cleaners. When the device connects together the cranks of pivotally supported windshield cleaners, the fact that its operating handle is intermediate its points of connection with the cranks of the cleaners assures against either of the cleaners locking on dead center, so to speak, for in drawing downwardly on the handle of the device, a like motion is imparted to the cranks of both devices. And in this connection it may be explained that in using the device, it is swung to and fro through an arc precisely as the crank of an individual cleaner is operated when used alone.

Another object of the invention is to provide a device of the aforesaid character that is very strong and durable and is, within itself, a complete commercial article that may be purchased of supply dealers and applied by the purchaser to a pair of standard type windshield cleaners in a comparatively short time and with little effort.

Figure 1:
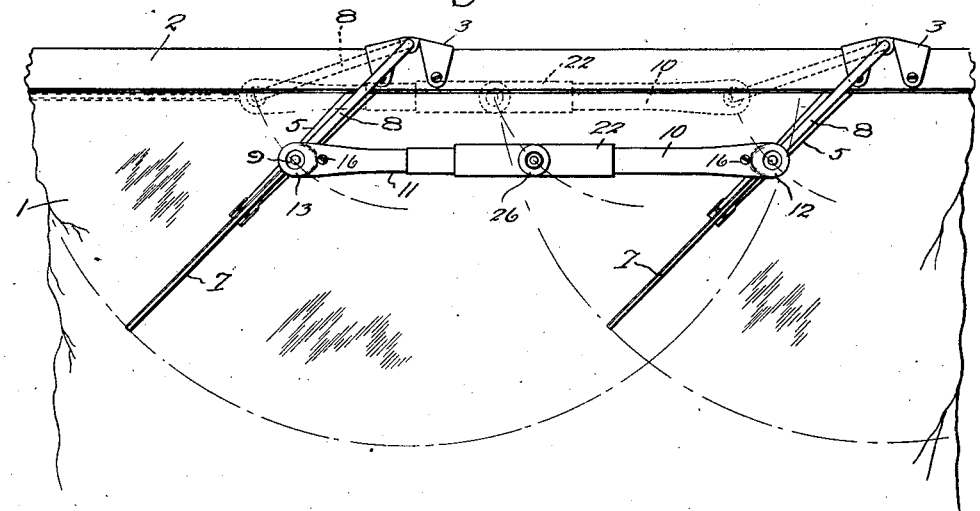
Figure 2:
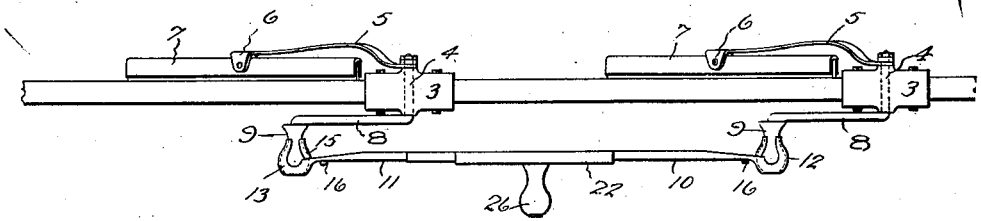
Figure 3:
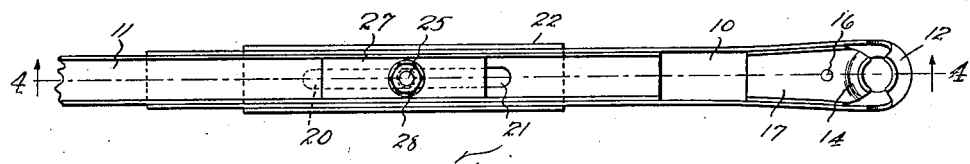
Figure 4:
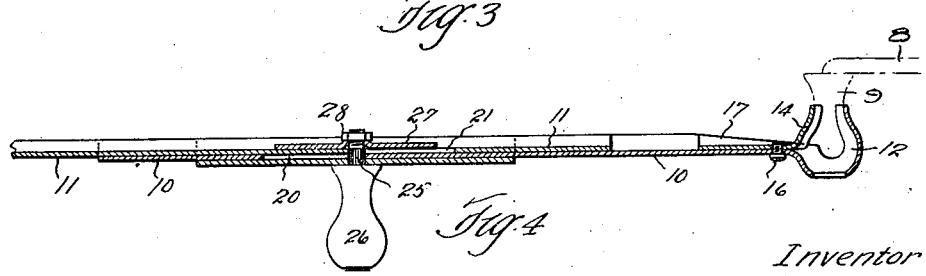

These, and other objects which will appear as this description proceeds are attained in the several embodiments of the invention illustrated in the drawings accompanying and forming a part hereof and wherein Fig. 1 is an inside elevational view of a windshield equipped with two cleaners that are operatively connected together by and in accordance with the present preferred form of my invention; Fig. 2 is a plan of what is shown in Fig. 1; Fig. 3 is a partial inside elevational view of the bar on a scale somewhat enlarged over that of Figs. 1 and 2; Fig. 4 is a section on the line 4—4 of Fig. 3; Fig. 5 is a fragmentary inside elevational view of a modified form of the invention showing it clamped to the actuating element or crank of a windshield cleaner; Fig. 6 is a plan, partly in section, of the parts shown in Fig. 5; Figs. 7 and 8 are views, similar to Figs. 5 and 6, respectively, of a further modified form of the invention; and Figs. 9 and 10 are a longitudinal section and an inside elevational view, respectively, of a still further modified form of bar connected to the actuating element or crank of a windshield cleaner.

In Figs. 1 and 2, the pane of the windshield is designated 1 and the frame thereof is designated 2. Brackets 3 are secured to the frame 2 in spaced relation to each other and support shafts 4 which have secured to their outer ends arms 5 which have connection at 6 with wipers 7 that bear against the outer surface of the pane 1. Cranks 8 extend at approximately right angles from the inner ends of the shafts 4 and are equipped at their free ends with knobs 9.

The particular windshield cleaners shown constitute no part of my invention, the same being of the type disclosed in an application filed by Chas. F. Laganke, on September 12, 1921, Serial No. 500,138. So far as my invention is concerned I may substitute for these cleaners any other standard types suited to the purpose. The cleaners enter into my invention only so far as they constitute elements of the general combination.

The present preferred form of the bar through which the operating handles of the two cleaners are connected is comprised of channel members 10 and 11 which telescope at their inner ends and terminate at their outer ends in fixed jaws 12. A removable jaw 14 is adapted to be secured in operative relation to each of the jaws 12, as by screws 16, the removable jaws having shanks 17 which fit within the channels of the members 10 and 11. The opposed jaws 12 and 14 at each end of the bar are formed to fit the knob 9 of the corresponding cleaner.

Where the inner ends of the channel members 10 and 11 overlap, their webs are provided with registering slots 20 and 21, respectively, and a clamping plate 22 of channel formation fits over the overlapped or telescoping ends of the members 10 and 11 and carries a stud 25 to which is applied a knob 26, similar to or identical with the knobs 9 of the cleaners. The stud 25 projects through the slots 20 and 21 and has applied to its inner end a clamping plate 27 which fits between the side flanges of the channel member 11 and beyond which a nut 28 is screwed onto the threaded end of the stud. By turning up this nut tightly the parts may be firmly clamped together in any adjusted position within the range of the slots 20 and 21, thereby to provide for variably spacing the windshield cleaners upon the windshield.

While I have shown cleaners of the type which clamp upon the frame, it is obvious that types which have their shafts journaled within apertures in the frame, or types whose shafts are pivotally supported within holes in the pane, may be substituted for those illustrated.

When the parts are mounted as shown in Figs. 1 and 2, the two wipers 7 may be swung across the pane by grasping the handle 26 and swinging the bar precisely as a single cleaner would be actuated. By situating the knob 26 intermediate the ends of the bar, a downward pull on the bar is transmitted with substantially equal force to both of the cleaners, avoiding the tendency of the cleaners to lock on dead center.

In Figs. 5 and 6 I have shown a bar made up of channel members 30 and 31 which telescope one within the other and are adapted to be bound together between clamping plates 32 and 33, the former being of channel formation and embracing the member 30. A knob 34 is mounted upon the outer end portion of a stud 35 which projects through aligning apertures in the clamping plates and through slots 36 and 37 in the webs of the respective channel members 30 and 31. The outer end of each of the members 30 and 31 terminates in a tongue 40 which is twisted into a plane at substantially right angles to the web of said channel and is formed into an eye designed to snugly embrace the neck of a knob 9 of a cleaner. The eye is clamped about the knob by a screw 41 that passes freely through an aperture in the lug 42 which is formed by the free end of the tongue 40, and is threaded into the opposed portion of said tongue.

Figs. 7 and 8 illustrate a bar that is formed of a single channel member 50 whose web is provided with a series of threaded apertures 51 into any one of which a stud 52 may be screwed which carries a knob 53. The web of the channel stops short of its ends and between the side flanges 54, where they protrude beyond each end of the web, are journaled rollers 55 on screws 56 that pass through apertures in one of the flanges and are threaded through tapped holes in the other. The rollers 55 are arranged to receive between them the neck of a knob 9. The knob 53 may be adjusted along the bar to suit the convenience of the operator.

Figs. 9 and 10 show a simplified form of the invention wherein the bar is composed of a metal strip 60 having holes 61 for the support of a stud 62 whereon a knob 63 is mounted. In using this form of the invention, the knobs 9 are dispensed with and the laterally turned inner ends of the cranks 8 of the cleaners are inserted through holes in the ends of the bar and collars 65, disposed on opposite sides of each end of the bar, are locked to the crank by set screws 66, thereby to maintain the bar in proper position on the crank.

Having thus described my invention, what I claim is:

1. In windshield cleaning apparatus, the combination with separate windshield cleaners pivotally supported in operative relation to the windshield so that they clean areas spaced apart laterally of the windshield pane, each of said windshield cleaners incorporating a crank, of a link connecting the cranks of the two windshield cleaners, and a handle connected to the link and adjustable longitudinally thereof.

2. In windshield cleaning apparatus, the combination with separate cleaners pivotally supported in operative relation to the windshield so as to clean areas spaced apart laterally of the windshield pane, each of said cleaners incorporating a crank equipped with a knob, of a link terminating at each end in a knob-embracing clamp by means of which the link is operatively connected to the cleaners, and an operating handle carried by the link.

3. In combination, two windshield cleaners, each having an actuating element, and a link for connecting together the actuating elements of the two cleaning devices, said link consisting of two channel members telescoping one within the other, clamping means for adjustably binding together the telescoped portions of said members, and means situated at the ends of the link for connecting it to the actuating elements of the cleaning devices.

4. In combination, two windshield cleaners, each having an actuating element, and a link for connecting together the actuating elements of the two cleaning devices, said link consisting of two channel members telescoping one within the other, the webs of the channel members having slots, clamping plates disposed on opposite sides of the telescoped portions of said members, an operating handle having a stud that is projected through aligning apertures in the clamping plates and through the slots of the channel members, means applied to the stud for drawing the parts together in holding engagement, and means situated at the ends of the link for connecting it to the actuating elements of the cleaning devices.

5. A link for operatively connecting two separate windshield cleaning devices, said link comprising channel members telescoping one within the other, the webs of the overlapped portions of said members being provided with slots, a clamping plate of channel formation applied to the outer channel member, a clamping plate disposed between the side flanges of the inner channel member, an operating handle having a stud projecting through aligning apertures in the clamping plates and through the slots of the channel members, and means applied to the stud for binding said parts in holding engagement with each other, the ends of the link being equipped with means for connecting them to the actuating elements of the cleaning devices.

6. A link for operatively connecting two windshield cleaning devices, said link being of channel formation and terminating at each end in a jaw designed to fit one side of the actuating element of one of the windshield cleaners, and a jaw for engagement with the opposite side of said element and having a part fitted between the side flanges of said link, and means for securing the last mentioned jaw to the link.

In testimony whereof, I hereunto affix my signature.

FREDERIC F. HESSE.